United States Patent [19]

Collman et al.

[11] 3,872,218

[45] Mar. 18, 1975

[54] SYNTHESIS OF ALKALI METAL TETRACARBONYLFERRATES

[75] Inventors: James P. Collman, Stanford; Stanley R. Winter, Irvine, both of Calif.

[73] Assignee: The Board of Trustees of the Leland Stanford Junior University, Stanford, Calif.

[22] Filed: June 11, 1973

[21] Appl. No.: 368,496

Related U.S. Application Data

[63] Continuation-in-part of Ser. No. 232,247, March 6, 1972.

[52] U.S. Cl. .............................................. 423/417
[51] Int. Cl. ......................... C01g 1/04, C01g 49/16
[58] Field of Search ............................ 423/417, 418

[56] References Cited
UNITED STATES PATENTS 3,044,853  7/1962  Maury et al. ...................... 423/390

OTHER PUBLICATIONS

Cook, "Facile Conversion of Alkyl Bromides into Aldehydes Using Sodium Tetracarbonylferrate (-II)," J. Am. Chem. Soc., Vol. 92, pps. 6080–6082, 1970.

*Primary Examiner*—Earl C. Thomas
*Attorney, Agent, or Firm*—Edward B. Gregg

[57] ABSTRACT

Production of alkali metal tetracarbonylferrate by reaction of alkali metal with an iron carbonyl, preferably iron pentacarbonyl [$Fe(CO)_5$], in a suitable solvent and in the presence of an electron carrier. Alkali metal may be in solid phase or liquid phase.

5 Claims, No Drawings

SYNTHESIS OF ALKALI METAL TETRACARBONYLFERRATES

The invention described herein was made in the course of work under grants or awards from the National Science Foundation.

This application is a continuation-in-part of our co-pending application Ser. No. 232,247, filed Mar. 6, 1972 entitled "Synthesis of Ketones".

This invention relates to the production of alkali metal tetracarbonylferrates, $M_2Fe(CO)_4$ wherein M is Na or K or a mixture of the two.

Heretofore, sodium tetracarbonylferrate having the formula $Na_2Fe(CO)_4$ has been prepared by various methods one of which, probably one of the best, is that described in Cooke, J. Am. Chem. Soc., 92, 6080 (1970). The method described by Cooke employs an amalgam of sodium and mercury which presents a problem in handling the mercury if the process is carried out on a large scale. Other methods are decribed in: H. Hock & H. Stuhmann, Chem. Ztg., 55, 874 (1931); H. Behrens, Z. *Naturforsch*, 76, 321 (1952); H. Behrens and R. Weber, Z. *Anorg. allgem. Chem.*, 281, 190 (1955); German Patent 933751; R. B. King and F. G. A. Stone *Inorg. Syn.*, 7, 193 (1963); R. B. King and F. G. A. Stone, ibid, 7, 197 (1963); W. Hieber, F. Leutert and E. Schmidt, Z. *Anorg. allgem. Chem.*, 204, 145 (1932); A. S. Kesenally, R. S. Nyholm and M. H. B. Stoddard, *J. Chem. Soc.*, 5343 (1965).

Such methods are disadvantages for several reasons, such as difficulties in handling mercury in the case of Cooke, low yields and/or the production of unwanted by-products, difficulties in workup, etc.

It is an object of the present invention to provide improvements in the preparation of sodium and potassium tetracarbonylferrates.

It is a particular object of the invention to provide a method of preparing sodium and potassium tetracarbonylferrates which uses relatively inexpensive reagents, solvents and the like and which results in high yields of acceptably pure product.

Another object it to provide a method which does not result in large quantities of by-products and which is easy to workup for recovery of the desired tetracarbonylferrate.

The above and other objects of the invention will be apparent from the ensuing description and the appended claims.

We have found that sodium and potassium tetracarbonylferrates can be prepared at relatively low cost, in high yield and of good purity by reacting metallic sodium or potassium (or sodium-potassium alloy) with an iron carbonyl, preferably iron pentacarbonyl in a suitable solvent and in the presence of an electron carrier, the reactions involved being as follows:

(1)    

(2)    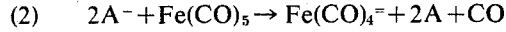

These reactions are carried out without separating the intermediate salt $M^+A^-$. For all practical purposes reactions (1) and (2) may be made to occur (and usually do occur) substantially simultaneously, although in the order indicated above. The electron carrier or catalyst A may be recovered and recycled, which provides one of the advantages of the invention.

Reactions (1) and (2) above are not intended to set forth the exact mechanism but to set forth the overall mechanism.

The electron carrier A may be any molecule (or mixture of molecules) which is or which contains a strong electron acceptor and which is compatible with the solvent, the reactants, the reagents and the end product. For example, strong oxidizing and/or reducing agents should not be used. Preferably, the electron carrier has at least a moderate solubility in the solvent, although a high solubility is not required. Examples of the electron carrier A are as follows:

Aromatic ketones such as benzophenone; 2- and 4-aminobenzophenones; 4-benzoylbiphenyl; o-dibenzoyl benzene; 4,4'-bis-(diethyl-amino) benzophenone; aromatic hydrocarbons such as benzene, naphthalene, anthracene, phenanthrene; aliphatic ketones having fully substituted (tertiary) aliphatic carbon atoms attached to the carbonyl group such as

where the R's are the same or different hydrocarbon groups, e.g., methyl; alkyl aryl ketones where the alkyl group likewise has a fully substituted carbon attached to the carbonyl group, such as

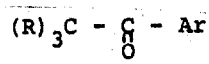

where the R's are as defined above and Ar is an aromatic group, e.g.,

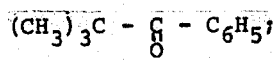

hetero analogues of the aromatic compounds mentioned above, e.g., wherein the pyridine ring is substituted for a benzene ring, as in 2,2'-dipyridyl; 4,4'-dipyridyl; di-2-pyridyl ketone; a variety of other or similar aromatic compounds such as 4-dimethylamino benzophenone; dibenzosuberone; 1,1,2,2-tetraphenylethene; acenaphthalene; benzyl dianil; trimesityl borane; hexamethylphosphortriamide; low molecular weight amines such as 1 amino propane, diethylamine, etc. and diamines such as ethylene diamine (preferably used only at lower temperatures); polyethers such as glyme and diglyme; tetrahydrofuran; certain salts having organic cations such as paraquat and diquat [see J.A.C.S., 89, 5562 and Chem. Comm. 1293 (1967)]; decaborane and disodium decaborane; triaryl phosphines such as triphenyl phosphine; cyclo-octadiene,

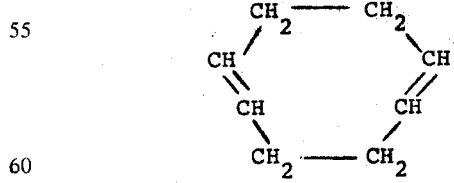

In general, the electron carrier or transfer agent is one which is reasonably soluble in the reaction solvent (and it may also function as the solvent or as a co-solvent); which is compatible with, i.e., it is not destructive of the solvent, reactants and desired end product; and it reacts with an alkali metal to form an anion such as the ketyls formed from ketones. Such anions result in solutions having a characteristic color, typically a blue color. In general, the electron carrier is one which accepts an electron from the alkali metal, thus $$A + M \rightarrow A^- + M^+$$

and which is effective to transfer the electron to the iron carbonyl. The preferred electron carriers are the aromatic ketones and trisubstituted boranes.

The alkali metal may be sodium, potassium or a mixture of the two, for example, an alloy of sodium and potassium in any proportions. The alkali metal may be alloyed with another metal, e.g., mercury, especially if it is desired to lower the melting point of the alkali metal. Sodium is preferred because it is cheaper and the principal utility of the tetracarbonylferrate salt is normally dependent upon the ferrocarbonyl dianion, $Fe(CO)_4^=$, e.g., to synthesize aldehydes, ketones, acids, esters and amides as described in several publications by Collman et al as follows: M. P. Cooke, J. Amer. Chem. Soc., 92, 6080 (1970); J. P. Collman, S. R. Winter and D. R. Clark, ibid, 94, 1788 (1972); J. P. Collman, S. R. Winter and R. G. Komoto, ibid, 95, 249 (1973); J. P. Collman and W. O. Siegl, ibid, 94, 2516 (1972); J. P. Collman, J. N. Cawse and J. I. Brauman, ibid, 94, 5905 (1972); J. P. Collman and Norris W. Hoffman, ibid, 95, 2689 (1973).

A wide variety of solvents may be used, such as tetrahydrofuran (THF), hexamethylphosphoramide (HMPA), methylpyrrolidone (MP), dimethylformamide (DMF), glyme, diglyme; lower ketones such as acetone and methyl ethyl ketone; dioxane, lower aliphatic ethers such as dimethyl and diethyl ethers; polyethers such as dimethoxy ether, cellosolve, cyclic polyethers such as dioxane and the crown ethers, lower aliphatic esters such as ethyl acetate and methyl acetate, diethyl carbonate, formic acid esters such as methyl and ethyl formates, lower nitriles such as acetonitrile and propionitrile, dimethyl sulfoxide, tetramethylene sulfone, pyridine, etc. It will be understood that in the above wherever a $C_1$, $C_2$ or $C_3$ alkyl group is identified, higher homologues, e.g., $C_4$ to $C_6$ may be used. The preferred solvents are the cyclic and acylic ethers.

As will be apparent, the same substance may function as an electron carrier and a solvent. Mixtures of solvents may be employed and where a co-solvent is also the effective electron carrier it may be used in minor amount, especially if it is relatively expensive, sufficient only to function as an electron carrier.

The iron carbonyl may be any of the iron carbonyls, such as $Fe_2(CO)_9$ or $Fe_3(CO)_{12}$ but iron pentacarbonyl is preferred, being quite suitable for the purpose and the least expensive of the iron carbonyls.

The alkali metal may be used in solid form, in which case it is preferably used in the form of a dispersion of small particles, e.g., 1 to 50 microns in an inert liquid such as mineral oil or liquid paraffin. Preferably, the alkali metal is used in the molten state. If the solvent boils at atmospheric pressure at a temperature above the metling point of the metal, the reaction may be carried out in boiling solvent at atmospheric pressure. If the solvent boils at atmospheric pressure at a temperature lower than the melting point, the reaction may be carried out under a pressure such that the solvent boils above the melting point of the metal.

It is advantageous to employ a solvent at a temperature above the melting point of the metal so that the metal is in the liquid state. By doing so the surface of the metal is always fresh and does not become encrusted and unreactive. By using potassium-sodium alloys, the melting point may be reduced, hence solvents such as THF which boil below the melting point of sodium may be employed while working at atmospheric pressure. By using only enough potassium (which is the more expensive metal) to depress the melting point of sodium below the boiling point of the solvent, lower boiling solvents may be used at atmospheric pressure.

If desired, the alkali metal may be alloyed with a non-alkali metal, e.g., mercury, to reduce its melting point.

The following specific examples will serve to further illustrate the practice and advantages of the invention.

EXAMPLE 1

Preparation of Sodium Tetracarbonylferrate by the Use of a Sodium Dispersion

In an oven dried 2 liter round-bottomed flask with a stopcock sidearm inlet were placed 9.2g (0.2 mole) of a 50% dispersion of sodium in mineral oil, 1.0g (0.005 mole) of benzophenone, and a magnetic stirring bar. The flask was flushed with dry, oxygen-free $N_2$, and 1 liter of dry THF (distilled from $CaH_2$ under $N_2$) was added to give a deep purple suspension, which is indicative of the formation of an anion of benzophenone. A solution of 13.4 ml (0.1 mole) of $Fe(CO)_5$ (dried over Linde 4A molecular sieves) in 100 ml of dry THF was placed in a dropping funnel fitted to the reaction vessel and added under $N_2$ to the purple suspension with rapid stirring. Carbon monoxide was evolved rapidly and after approximately 10 ml of the $Fe(CO)_5$ had been added, the salt $Na_2Fe(CO)_4$ precipitated to give a thick slurry which required vigorous stirring for thorough mixing. The bluish-purple color was titrated with the $Fe(CO)_5$ solution until there were no visible sodium particles and the blue color did not return after 4 hours of stirring.

Precipitation of the tetracarbonylferrate was completed by the addition of 1 liter of degassed hexane and the white solid allowed to settle. The brown liquid was then decanted and the precipitate washed with two 1 liter portions of degassed hexane, once by decanting and a second time by using positive $N_2$ pressure to filter the solvent through a fritted gas inlet tube. The last traces of the solvent were removed at room temperature and 0.2 mm. pressure to give 18.7g (88%) of the white powdery disodium tetracarbonylferrate.

EXAMPLE 2

Preparation of Same Salt in Solvated Form by Use of a High Boiling Point Solvent To dry, degassed dioxane was added 23 g (1.0 mole) sodium in 8 chunks. Then 18.2g (0.1 mole) benzophenone was added whereupon a blue color formed indicating the formation of the sodiumbenzophenone ketyl, $Na^+[\phi CO\phi]^-$. The dioxane was allowed to reflux for 10–15 minutes then with the stirrer on full power, 40 ml $Fe(CO)_5$ were added over 30 minutes. The last 27 ml of $Fe(CO)_5$ were added over 20 minutes and the reaction stirred 1 hour, when no blue color was observed. The resulting precipitate was filtered using special glass frit and the dioxane filtered into a holding flask for another prep. The ppt was washed 3 times (1500 ml) with petroleum ether and then pumped on at about 1mm/30°–50°C to remove the last traces of petroleum ether. The product was a white powder.

By gas chromatographic and nmr techniques, it was determined that this powder was (except for a very small amount of impurities which do not interfere with its use for purposes of synthesizing aldehydes, ketones, etc. as described in the literature references above) a solvated form of disodium tetracarbonylferrate having the ferrate and dioxane in the molecule in the proportions of 2 and 3, respectively, thus

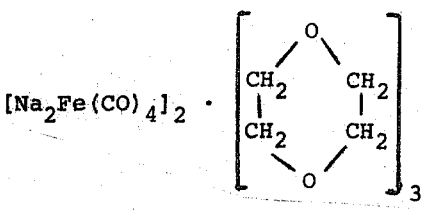

The molecular weight is 346.

The analysis employed the quantitative reaction (omitting the dioxane component, which does not enter into the reactions)

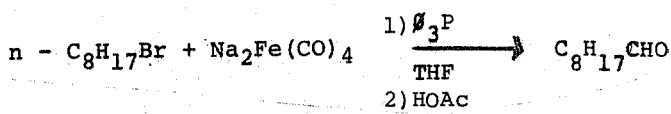

This reaction is carried out in the manner described in the Cooke paper cited above. Excess triphenyl phosphine and n-octyl bromide were added to THF containing a weighed amount of the disodium salt. The reaction was allowed to proceed 2 to 3 hours at room temperature under nitrogen, the reaction mixture was quenched with acetic acid and the amount of nonanal was determined by gas chromatography using dodecane as internal standard by reference to previous standardization with nonanal. The purity of the product (i.e., the solvated tetracarbonylferrate) was determined in this manner and from the purity, the yield was determined. Purity and yield were about 95–100% and 80–100%, respectively.

EXAMPLE 3

Preparation of Same Salt by Use of a Low Boiling Solvent Under Pressure

Using a Fisher-Porter bottle, 0.86 g (37.4 mmol) of solid sodium metal and 2.91 g (16 mmol) of benzophenone were added to 40 ml of dry, degassed THF under $N_2$ flow. The reaction turned blue, characteristic of the ketyl. The Fisher-Porter bottle was then pressured up to 43 psi over atmospheric with CO and the whole reaction stirred vigorously using a magnetic stirrer at 120°. At this pressure THF can reach temperatures in excesss of 100° before boiling. The reaction was cooled to 60° and 2.25 ml (16.8 mmol) of $Fe(CO)_5$ was added. A white precipitate remained after addition of n-hexane. Washing the white precipitate and pumping to dryness gave a product that yielded 92% nonanal based on 214 MW for $Na_2Fe(CO)_4$. The product of this example was not solvated.

EXAMPLE 4

Preparation of Mixed Na and K Tetracarbonylferrates by the Use of a Sodium Potassium Alloy The 29% potassium K—Na alloy was prepared by melting 4.4 g (192 mmol) sodium and 1.5 g (38 mmol) potassium in boiling xylene. The alloy was then allowed to resolidify and then was added to the reaction vessel. The reaction was carried out using 250 ml of refluxing THF, 3.6 g (20 mmol) benzophenone and the K-Na alloy.

$Fe(CO)_5$ (13.5 ml, 100 mmol) dissolved in 20 ml of THF was added over 50 minutes. The reaction was allowed to stir for 2 hours and worked up in the usual fashion. An 81.2 yield of mixed Na and K (or Na—K) tetracarbonylferrate resulted. Titer on this anion gave a quantitative yield of nonanal based on an average MW of 220.

The alkali metal tetracarbonylferrates are sensitive to water and oxygen, therefore should be kept in nonaqueous environments and free from air. If other metal tetracarbonylferrates are desired, they may be produced from the alkali metal species by metathesis. For example, the sodium salt in THF may be treated with lithium bromide to produce sodium bromide, which is insoluble in THF, and lithium tetracarbonylferrate in solution in THF. The temperature at which the reaction of alkali metal with iron carbonyl is carried out may vary considerably, e.g., from room temperature (25°C) or lower to 100°C or higher. Low temperatures tend to reduce reaction rates and/or to reduce the solubility of reactants while high temperatures tend to degrade the electron carrier or its anion.

It will, therefore, be apparent that novel and important methods of producing alkali metal tetracarbonylferrates have been provided.

I claim:

1. A method of producing a tetracarbonylferrate $M_2Fe(CO)_4$ wherein M is Na, K or a mixture of the two, said method comprising reducing an iron carbonyl with the metal M in elemental form in a solvent and in the presence of an electron carrier A capable of the reactions (a) and (b), (a) $2M + 2A \rightarrow 2M^+ + 2A^-$ (b) $2A^- + Fe(CO)_5 \rightarrow e(CO)_4^= + 2A$ 2. The method of claim 1 wherein the iron carbonyl is iron pentacarbonyl.

3. The method of claim 2 wherein the metal M is employed in the form of a dispersion in an inert liquid.

4. The method of claim 2 wherein the electron carrier A is an aromatic ketone.

5. The method of claim 4 wherein the aromatic ketone is benzophenone.

* * * * *